Jan. 7, 1958 E. V. BERGSTROM 2,819,124
METHOD AND APPARATUS FOR SEPARATING GRANULAR PARTICLES
FROM LIFT GAS IN A PNEUMATIC LIFT
Filed March 28, 1956 2 Sheets-Sheet 2
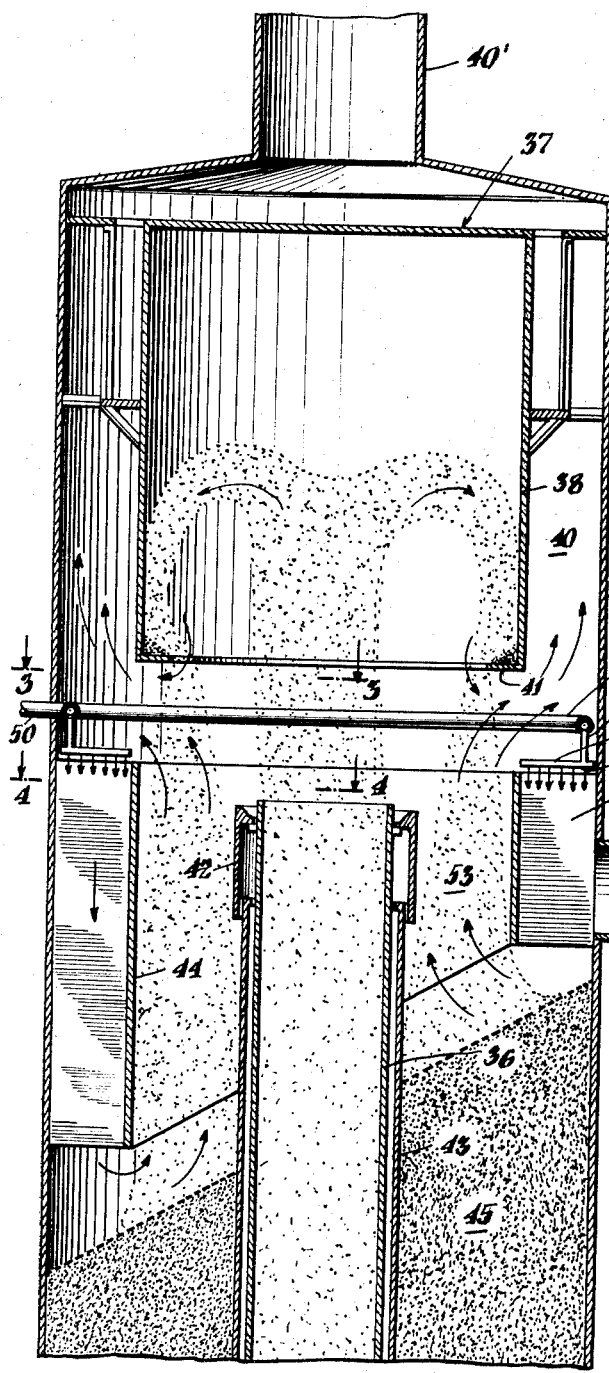
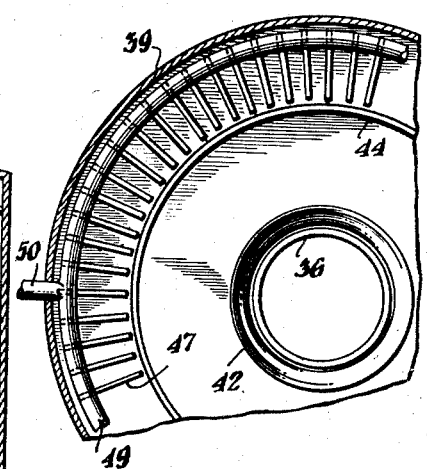
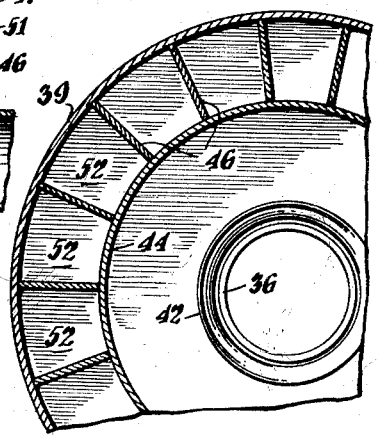
INVENTOR
Eric V. Bergstrom
BY
Charles A. Huggett
ATTORNEY United States Patent Office 2,819,124
Patented Jan. 7, 1958

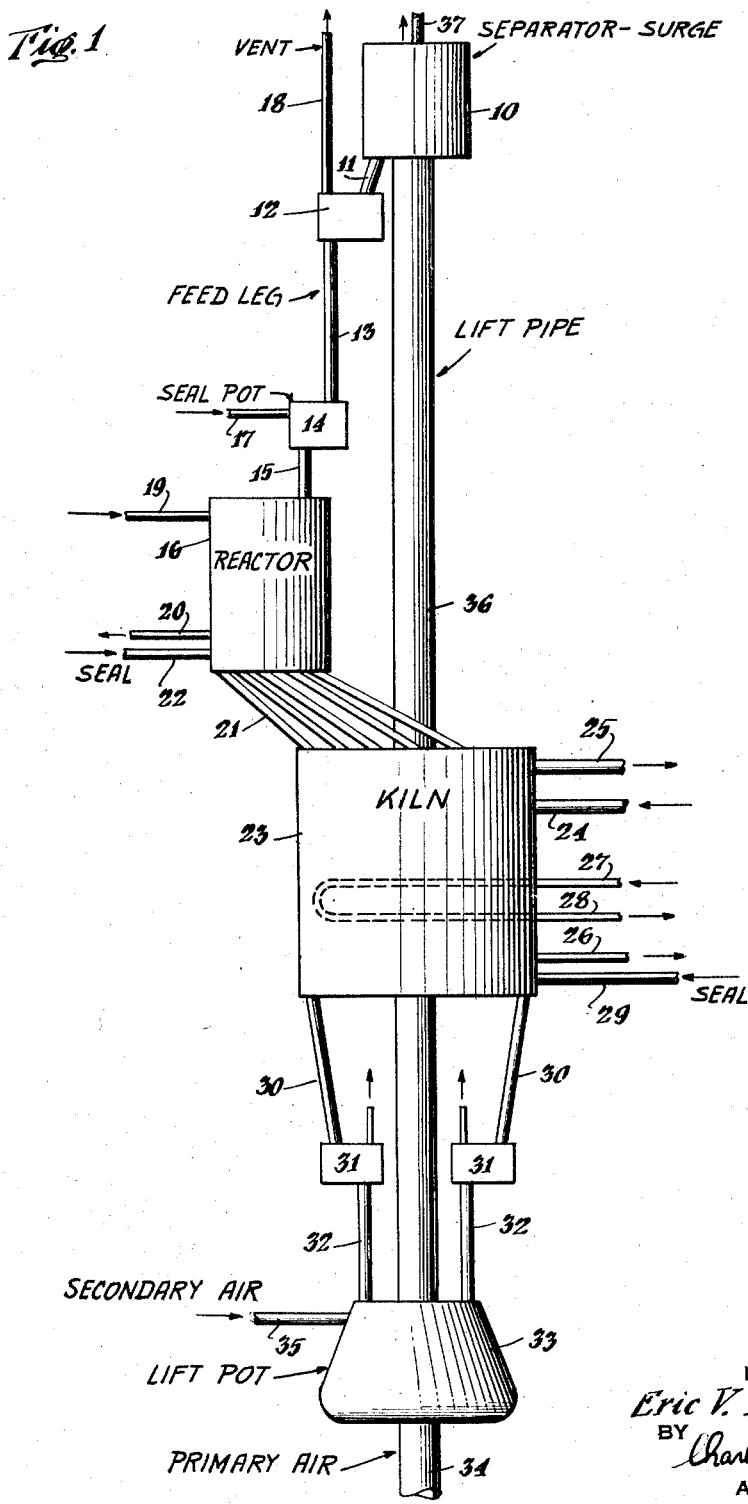

2,819,124

METHOD AND APPARATUS FOR SEPARATING GRANULAR PARTICLES FROM LIFT GAS IN A PNEUMATIC LIFT

Eric V. Bergstrom, Short Hills, N. J., assignor to Socony Mobil Oil Company, Inc., a corporation of New York Application March 28, 1956, Serial No. 574,487

5 Claims. (Cl. 302—59)

This case relates to the separation of lift gas from solid particles at the top of an upwardly-extending pneumatic lift, and particularly relates to the separation of lift gas from granular contact material in the separator of a pneumatic lift used to elevate contact material in the moving bed hydrocarbon conversion processes.

In the moving bed system a granular contact material or catalyst is gravitated as a substantially compact moving bed or stream through a reaction zone where it is contacted with hydrocarbons and through a regeneration zone where it is contacted with air to burn contaminants from the particulate material which accumulated there during the reaction period. Typical of these processes are hydrogenation, dehydrogenation, reforming and catalytic cracking. The process has been used extensively in commercial operation for cracking heavy oils to produce lighter oils boiling in the gasoline boiling range, and has been known commercially as the TCC process. When the particulate material has reached the bottom of its travel, it must be elevated for re-use in the process and pneumatic lifts in which the particles are blown upwardly through a lift pipe in a rapidly moving stream of lift gas, have been developed and used for this purpose. These lifts comprise essentially an upwardly-extended open-ended lift pipe with the upper end projected into an enlarged separator and terminated intermediate the top and bottom thereof and the lower end of the lift pipe projected downwardly into a lift tank and terminated intermediate the top and bottom thereof. The particles flow in compact form downwardly into the lift tank to form a bed of material about the lower end of the lift pipe. A gas is introduced into the lift tank in sufficient quantity to enter the lift pipe and entrain a stream of rising gas therein. The particles and lift gas discharge from the upper end of the lift pipe into the enlarged separator vessel where the particles lose their upward momentum and fall downwardly to the surface of a bed of solid material maintained about the upper end of the lift pipe in the lower portion of the separator vessel. The gas is withdrawn free of contact material from the upper portion of the vessel.

Various types of natural and treated clays have been used as catalyst in the TCC process. Generally, however, a synthetic silica-alumina or chrome-alumina clay is used having high resistance to attrition or breakage. These particles are formed in the size range larger than 100 mesh and up to as much as ½" in cross-section or more. Generally, in the TCC process, however, the particles are within a size range of about 4 to 10 mesh Tyler screen analysis. Since the vapors in the reaction zone and the gases in the regeneration zone pass through the void space in the bed of catalyst, it is desirable that the particles be kept within a fairly narrow range of size in order to avoid plugging of the voids in the bed and thereby avoid irregular flow of gas through the bed. Where breakage of the particles occurs, the broken particles or fines of a size range substantially smaller than the desired range must be continuously removed. Excessive breakage thereby requires the replacement of undesirable quantities of catalyst and this becomes expensive. For this and other reasons, breakage or attrition of the granular material or catalyst must be minimized.

In transferring the catalyst through pneumatic lifts, breakage has been found to occur both in the engaging step within the lift tank during transfer through the lift pipe and in the separation step in the separator. It has been found that for smooth flow of the particles through the lift pipe with minimum breakage therein, that the particles must be discharged from the top of the lift pipe with a fairly substantial velocity. This causes the catalyst particles to be projected a substantial distance above the lift pipe before their momentum is lost and they commence to fall. When falling from this distance down to the bed of catalyst in the lower section of the separator freely, the particles break more frequently than desired.

The object of this invention is to provide an improved separator and method of separating granular contact material from lift gas in a pneumatic lift which minimizes the breakage or attrition of the granular material in the separation step.

A further object of this invention is to provide an improved separator design for use in the TCC process which permits smooth operation of the pneumatic lift without surging and separates the granular material from the gas with minimum attrition of the material.

A further object of this invention is to provide in a pneumatic lift separator, a means and method of reducing the impact of the falling granular material so as to prevent excessive attrition in the separation step. These and other objects will be made apparent in the detailed discussion of the invention which follows hereinafter.

Figure 1 is a schematic showing of a complete hydrocarbon conversion system, such as a TCC system;

Figure 2 is a vertical elevation of a pneumatic lift separator;

Figure 3 is a plan view of a portion of the separator of Figure 2 as seen on plane 3—3 of Figure 2;

Figure 4 is a plan view of a portion of the separator of Figure 2 as seen on plane 4—4 of Figure 2.

In one embodiment of the invention, the particles are discharged from the upper end of the lift pipe into the separator to travel a substantial distance above the top of the pipe and as the particles fall about the top of the lift pipe, they are contacted with a rising stream of gas introduced into the separator at a level below the top of the lift pipe, the upward velocity of the rising gas being sufficient to reduce the speed of the falling particles so that they contact the bed in the bottom of the separator at reduced velocity over that which they would obtain if permitted to fall freely. The velocity reducing gas commingles with the gas discharged from the top of the lift and the combined streams of gas exit from the separator in the upper portion thereof. This and other more detailed embodiments of the invention will be discussed more fully in the following portion of the specification.

Referring now to Figure 1, the system will be described in its application to the TCC process. A granular catalyst is withdrawn from the bottom of the separator 10 as a compact stream through the conduit 11 into the box 12 and downwardly as a compact leg through the gravity feed leg 13, to the seal pot 14, through the connecting conduit 15 and reactor 16. The pressure in the reactor 16 is generally maintained higher than atmospheric and more specifically, at about 10 to 15 pounds per square inch gauge. The pressure in the separator is generally atmospheric. The gravitating column of catalyst from the separator to the reactor must be at least long enough to insure that the catalyst particles will continue to flow smoothly into the reactor against the advanced pressure therein. In order to prevent reactants from escaping from the reactor, a seal gas is introduced into the seal pot 14 through the conduit 17 at a pressure just slightly higher than the reactor pressure so that some gas flows downwardly into the reactor and some flows upwardly to the pot 12. The major portion of the upwardly flowing gas is disengaged from the catalyst in the pot 12 and passed through the vent 18 to be discharged to the atmosphere. Reactants are introduced into the top of the reactor through the conduit 19 properly prepared for reaction and travel downwardly through the reaction bed. The reactor is maintained at an advanced temperature, such as approximately 800 to 1000° F., and cracking of the reactants occurs as the vapors pass downwardly through the bed. The products are withdrawn from the lower portion of the reactor through the conduit 20 and transferred to other processing apparatus. A contaminant accumulates on the catalyst during transfer into the reactor and the contaminated catalyst is withdrawn from the bottom of the reactor as compact streams through the conduits 21. In order to prevent the reactants from passing downwardly through the conduits 21, and in order to effectively purge the catalyst, a seal gas is introduced into the bottom of the reactor through the conduit 22 at a suitable pressure.

The catalyst gravitates downwardly through the kiln 23. Air is introduced into the kiln through the conduit 24 at a pressure slightly higher than atmospheric and travels downwardly and upwardly through the mass of catalyst to effectively burn the contaminant from the catalyst. The flue gas formed by this combustion is withdrawn from the top of the kiln through the conduit 25 and the bottom of the kiln through the conduit 26. In order to prevent excessive temperature in the kiln which would damage the catalyst, a cooling medium is sometimes introduced through heat transfer coils 27, 28. Although in many instances this is unnecessary, in order to provide heat balance in those cases where heat is not extracted from the kiln, a cooler or heat exchanger of some sort must be provided in the system or somewhere within the system. An inert gas is introduced into the lower portion of the kiln through the conduit 29 at a pressure sufficient to prevent the escape of combustion gases from the lower section of the kiln. The regenerated catalyst is withdrawn from the bottom of the kiln through the conduit 30 as compact streams. This catalyst is passed through the vent boxes 31 and conduits 32 in compact form into the top of the lift pot 33. Gas is introduced through the primary gas pipe 34 and secondary gas pipe 35 in sufficient quantity to contact the catalyst and cause it to move upwardly through the lift pipe 36 as a separated but smoothly flowing stream. The gas is separated from the catalyst in the separator 10 and discharged from the top of the separator through the conduit 37 to the atmosphere. The separated catalyst particles fall within the separator onto the bed of catalyst in the lower portion of this vessel, and are withdrawn from the bottom of the vessel through the conduit 11, thereby completing the enclosed cyclic path.

Referring now to Figure 2, where the invention is disclosed in more detail, it is seen that there is located above the top of the lift pipe 36 an enclosed skirt baffle 37. The baffle skirt 38 of the baffle 37 is concentric with the vertical wall 39 of the separator 10 and forms an annular passageway 40 with this wall of the vessel through which the gases escape upwardly to the discharge pipe 40 located atop the vessel 10. The particles discharging from the top of the lift pipe 36 travel upwardly into the skirt section of the enclosed baffle 37 where they lose their momentum and fall downwardly so as to form a fountain, similar to that of a water fountain.

At the bottom of the skirt 38 of the enclosed skirt baffle 37 is located an inwardly-extending flange 41. This flange extends inwardly only a short distance and serves to confine the falling catalyst fountain to a region around the lift pipe 36. The lift pipe 36 has a hat 42 attached to its upper end which encloses the upper end of the vertical conduit 43. This conduit 43 surrounds the lift pipe within the separator 39 and is attached to the floor of the separator. This arrangement provides for expansion and contraction of the lift pipe and yet prevents particles from passing between the conduit 43 and lift pipe 36. Surrounding the lift pipe near its upper end is an open-ended vertical baffle or conduit 44. This conduit extends at its lower end for a substantial distance below the top of the lift pipe but is still terminated a substantial distance above the bottom of the separator 39. This open-ended baffle is made of large enough diameter so that the falling fountain of catalyst passes between the baffle and the lift pipe in its path to the surface of the bed of catalyst 45 maintained in the lower portion of the separator. The open-ended conduit or baffle 44 is located substantially concentric with both the lift pipe and the vessel 39. In the annular region between the open-ended baffle 44 and the wall of the vessel 39, is located a series of vertical and radially-extending flat baffles 46. These baffles are shown in more detail on the plan view Figure 4. These radially-extending flat baffles 46 divide the annular lift between the open-ended conduit 44 and the vertical wall of the vessel 39 into a series of vertically-extending passageways. Above these passageways are located a series of pipes 47 having apertures in their lower surfaces (see Figure 5). These pipes connect by connecting-conduits 48 with a manifold 49 and this manifold connects to a conduit 50 projected through the wall of the vessel. A suitable fluid is introduced through the pipe 50 into the manifold 49 and discharged therefrom through the connecting-conduits 48 into the horizontally arranged pipes 47 and discharged therefrom through the apertures 51 in a downward direction in the passages 52 toward the surface of the bed of catalyst 45. This gas is introduced in sufficient quantity so that at the lower edge of the open-ended conduit 44 it sweeps around this edge and passes upwardly within the annular space between the lift pipe and the inner surface of the open-ended conduit 44 at fairly high velocity. This gas serves to retard the downward velocity of the catalyst by flowing in countercurrent flow with the falling catalyst at a velocity which is high enough to cause the desired reduction in falling velocity of the catalyst. By this expedient, the catalyst particles can be so reduced in downward falling velocity that they strike the surface of the bed of catalyst 45 with substantially less impact than would be true if the particles were permitted to fall freely. At the upper end of the open-ended conduit 44, this velocity-retarding gas disengages from the falling catalyst and commingles with the lift gas discharged from the top of the lift pipe. The combined streams of gas pass through the annular passageway 40 surrounding the skirt 38 of the skirt baffle 37. These combined streams of gas are then discharged from the top portion of the separator through the conduit 40.

By discharging the required amount of steam or inert gas from the apertures 51 at the bottom of the horizontal conduits 47, a localized circulating gas system is provided. Gas passes downwardly through the passages 52 and upwardly through the annular region 53 and some of this gas enters again into the top of the passages 52 to pass downwardly with additonal quantities of steam or inert gas. While the velocity of the upwardly-flowing gas in the annular region 53 can be adjusted to provide the desired amount of deceleration or velocity reduction of the falling particles, an upward gas velocity of about 30 to 40 feet per second is generally satisfactory for granular catalyst used in the TCC system. The catalyst falling downward at about 30 feet per second meets this rising flow of air or other gas, and is slowed up before impinging on the catalyst bed. The effect is to reduce the equivalent height of fall from approximately 15 feet to about 7 feet, meanwhile permitting the operation of the pneumatic lift with discharge velocities well above or out of the surging range. This results in a substantial reduction in attrition in the separation step, for when 350 tons per hour of granular catalyst material is dropped 15 feet, the attrition is over 2 tons per day, whereas at the same flow rate of 350 tons per hour if that material is dropped only 7 feet, the attrition is approximately .5 ton per day.

While the invention has been described in relation to the TCC system and specific apparatus has been disclosed, it is not intended that the invention be limited to the specific embodiment described and shown. The only limitations intended are those contained in the appended claims.

I claim:

1. In a moving bed conversion process in which a granular catalyst is gravitated as a compact mass through reaction and regeneration zones and is elevated through an upwardly extending lift passage by the flow of a stream of lift gas, the improvement in the method of separating the lift gas and solid particles after discharge from the lift passage which comprises: discharging the mixed stream of gas and solids from the top of the lift passage into a separation zone of enlarged cross-section, whereby the solids lose their upward velocity and commence to fall to the lower portion of the separation zone, maintaining a bed of the solid particles on the floor of the separation zone and about the upper end of the lift passage, introducing a gas into the region between the lift passage and the wall of the separation zone at a level above the bed of solid particles, to travel upwardly toward the upper portion of the separation zone in countercurrent flow with the falling solids, at an upward velocity sufficient to substantially impede the falling catalyst particles, whereby the particles strike the surface of the bed of solids in the lower portion of said separation zone at a velocity substantially lower than if they were permitted to fall freely, whereby the breakage of the particles is minimized, commingling the rising streams of gas and withdrawing the gas from the upper portion of the separation zone, withdrawing at least one compact stream of solid particles from the lower portion of said separation zone, at a rate low enough to maintain a bed surface within the lower portion of said separation zone, whereby the solid particles are separated from their lifting gas with a minimum of particle attrition and breakage.

2. Claim 1 further characterized in that the falling catalyst particles in said separation zone are baffled to fall through a path of restricted horizontal cross-section, the gas introduced into the region between said lift passage and separation zone wall is passed upwardly in countercurrent flow with the stream of falling catalyst particles, thereby retarding the downward movement of the catalyst particles and wherein a portion of said gas after disengagement from the falling stream of catalyst particles is passed downwardly external of said falling stream of solid catalyst particles to complete an enclosed cyclic path, whereupon the quantity of gas required to reduce the fall of the solid particles in the separation zone is minimized.

3. In a moving bed conversion system in which granular solid catalyst particles are gravitated as compact streams through reaction and regeneration vessels and are elevated in a stream of lift gas through an upwardly extending lift passageway from a lift tank below one of the vessels to a separator above the other of said vessels, the improved separator comprising in combination: an enlarged vessel located about the upper end of said lift passageway, with the lift passageway terminated intermediate the top and bottom of said vessel, an enclosed cylindrical baffle located within the separator above the lift passageway, the skirt of said baffle terminated near the top of said lift passageway, said cylindrical baffle defining an annular passageway between the baffle and the vessel wall, for upward withdrawal of lift gas, gas withdrawal means in the upper portion of said vessel and communicating with said annular passageway, means for introducing a gas into contact with the falling catalyst particles at a level below the level of the top of said lift passageway but substantially above the bottom of said vessel, means for confining the flow of said gas to an upward flow countercurrent to the falling catalyst particles for a substantial distance, sufficient to effectively retard the movement of the falling catalyst particles and minimize breakage thereof, and means for withdrawing solid particles from the bottom of said vessel.

4. Claim 3 further characterized in that an open-ended cylindrical baffle is vertically located in said vessel about the upper end of said lift passage, adapted to confine the stream of falling catalyst particles within the annular region between said cylindrical baffle and said lift passageway, means for introducing gas uniformly about the annular region between said cylindrical baffle and the wall of said vessel, in a downwardly flowing direction, in sufficient amount to cause the flow of an upward current of gas in the annular region between said cylindrical baffle and said lift passageway, strong enough to substantially retard the fall of catalyst particles in said region.

5. Claim 4 further characterized in that a plurality of flat vertical baffles are arranged in a radial pattern extending between the open-ended cylindrical baffle and the wall of said vessel, so as to divide the annular region between said cylindrical baffle and vessel wall into vertical passageways of uniform cross-section, gas injection nozzles located at the upper end of said passageways for downward discharge of gas into said passageways, means for supplying gas to said injection nozzles communicating with the exterior of said vessel, whereby a strong eddy current is developed in the vessel providing countercurrent contacting of the gas current with the falling catalyst particles in the region between the open-ended cylindrical baffle and the lift passageway.

References Cited in the file of this patent

UNITED STATES PATENTS

| | | |
|---|---|---|
| 2,684,927 | Bergstrom | July 27, 1954 |
| 2,702,208 | Hill | Feb. 15, 1955 |
| 2,705,664 | McClure | Apr. 5, 1955 |